United States Patent
Solomon et al.

(10) Patent No.: US 8,332,849 B2
(45) Date of Patent: Dec. 11, 2012

(54) PARAVIRTUALIZATION ACCELERATION THROUGH SINGLE ROOT I/O VIRTUALIZATION

(75) Inventors: Richard L. Solomon, Colorado Springs, CO (US); Timothy E. Hoglund, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 794 days.

(21) Appl. No.: 12/454,626

(22) Filed: May 20, 2009

(65) Prior Publication Data

US 2009/0300660 A1 Dec. 3, 2009

Related U.S. Application Data

(60) Provisional application No. 61/130,461, filed on May 30, 2008.

(51) Int. Cl.
*G06F 9/455* (2006.01)
*G06F 3/00* (2006.01)
(52) U.S. Cl. ............................. 718/1; 710/1
(58) Field of Classification Search .................. None
See application file for complete search history.

(56) References Cited

U.S. PATENT DOCUMENTS

| | | | | |
|---|---|---|---|---|
| 7,984,108 | B2* | 7/2011 | Landis et al. | 709/215 |
| 8,151,265 | B2* | 4/2012 | Ben-Yehuda et al. | 718/1 |
| 2006/0195617 | A1* | 8/2006 | Arndt et al. | 710/1 |
| 2006/0200821 | A1* | 9/2006 | Cherkasova et al. | 718/1 |
| 2008/0091915 | A1* | 4/2008 | Moertl et al. | 711/206 |

OTHER PUBLICATIONS

Willmann et al. "Concurrent Direct Network Access for Virtual Machine Monitors", 2007, IEEE, pp. 306-317.*

* cited by examiner

*Primary Examiner* — Kenneth Tang
(74) *Attorney, Agent, or Firm* — Suiter Swantz pc llo

(57) ABSTRACT

The present invention is directed to an information handling system device for operatively coupling with a device implementing Input/Output (I/O) virtualization for data transmission. The information handling system device may be configured for executing an operating system control program to manage one or more guest operating systems on the information handling system device. The operating system control program may include a paravirtualization driver for formulating a work queue entry according to the I/O virtualization of the device. Data may be transmitted between the one or more guest operating systems and the device via the paravirtualization driver.

4 Claims, 1 Drawing Sheet

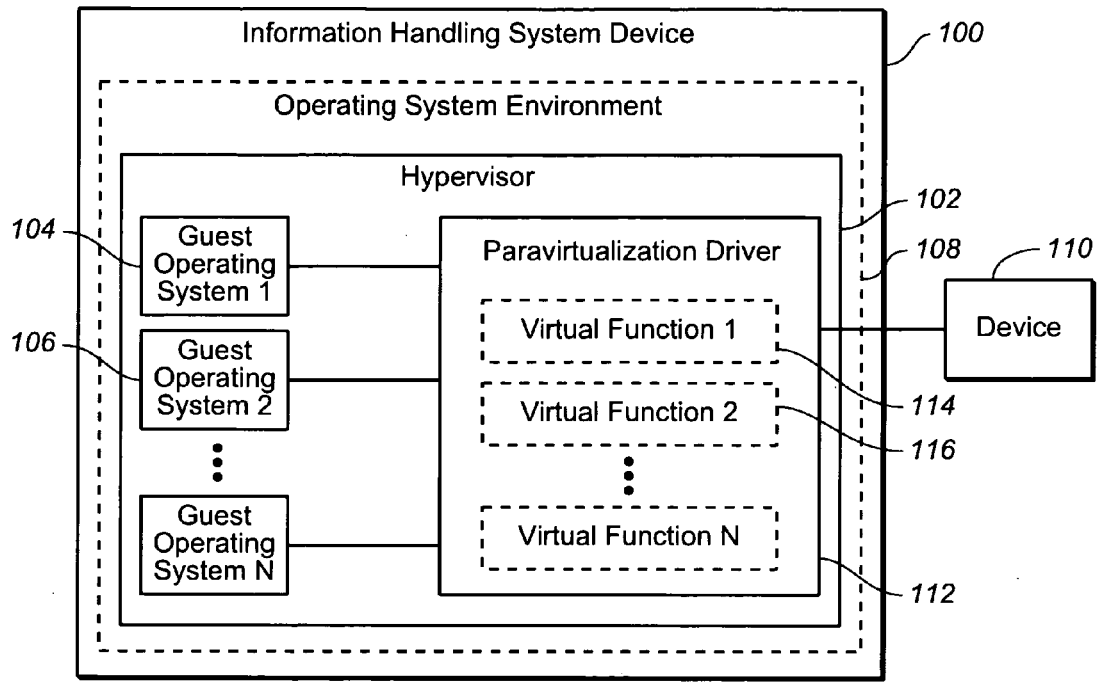
FIG. 1
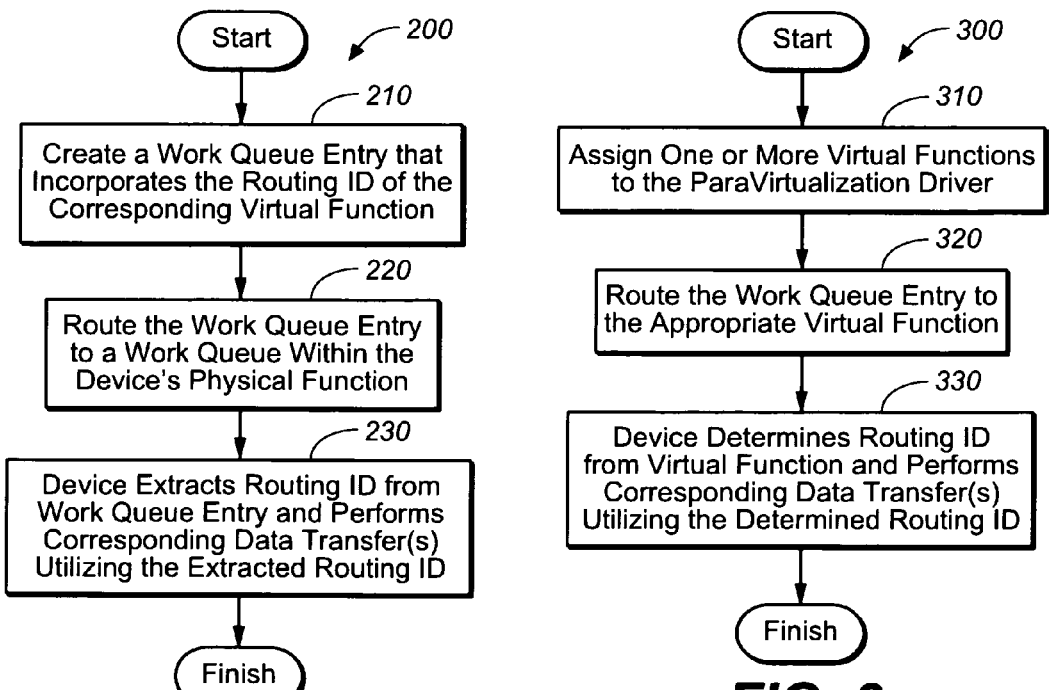
FIG. 2
FIG. 3

PARAVIRTUALIZATION ACCELERATION THROUGH SINGLE ROOT I/O VIRTUALIZATION

CROSS-REFERENCE TO RELATED APPLICATIONS

The present application claims the benefit under 35 U.S.C. §119(e) of U.S. Provisional Application Ser. No. 61/130,461, filed May 30, 2008, which is incorporated herein by reference.

TECHNICAL FIELD

The present disclosure generally relates to the field of peripheral component interconnection, and more particularly to a system allowing paravirtualization acceleration through input/output virtualization.

BACKGROUND

Peripheral Component Interconnect (PCI) Express is a computer expansion card interface format that allows a computer system to communicate with a variety of peripheral devices. Single Root Input/Output Virtualization (IOV) may be utilized with the PCI Express interface format to assign virtual functions to virtual machines/operating systems. Single Root IOV allows multiple virtual machines running simultaneously within a single computer to natively share one or more PCI Express devices. Central Processing Unit (CPU) manufacturers are providing virtualization accelerator functions that depend on features of Single Root IOV. However, paravirtualization is still widely practiced in the computer industry, where virtual machines utilize special drivers to communicate with a central driver, which then transmits all Input/Output (I/O) requests to a peripheral mechanism. This type of paravirtualization has no standard way to leverage the benefits provided by the virtualization accelerator functions. Moreover, a lack of standardization for such paravirtualization may require enhancements specific to each device, as well as device-specific computer code in critical hypervisor paths.

SUMMARY

The present invention is directed to an information handling system device for operatively coupling with a device implementing Input/Output (I/O) virtualization for data transmission. The information handling system device may be configured for executing an operating system control program to manage one or more guest operating systems on the information handling system device. The operating system control program may include a paravirtualization driver for formulating a work queue entry according to the I/O virtualization of the device. Data may be transmitted between the one or more guest operating systems and the device via the paravirtualization driver.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1 is a block diagram illustrating a system including a hypervisor having a paravirtualization driver, wherein the paravirtualization driver is connected to a peripheral device utilizing input/output virtualization;

FIG. 2 is a flow diagram illustrating a method for formulating a work query entry according to the input/output virtualization of a device; and FIG. 3 is a flow diagram illustrating another method for formulating a work query entry according to the input/output virtualization of a device.

DETAILED DESCRIPTION

Reference will now be made in detail to the subject matter disclosed, which is illustrated in the accompanying drawings.

Referring generally to FIG. 1, a single root complex utilizing Input/Output (I/O) virtualization is described in accordance with exemplary embodiments of the present invention. The single root topology comprises a single computer that supports virtualization technology (e.g., information handling system device 100). The information handling system device 100 is configured for executing an operating system control program, such as hypervisor 102, or the like, to manage guest operating systems/virtual machines on the single root. For example, the hypervisor 102 may be configured to manage a first guest operating system 104 and a second guest operating system 106.

It will be appreciated that in some embodiments, the hypervisor 102 may comprise software for execution directly on the hardware platform of the information handling system device 100. In other embodiments, the hypervisor 102 may comprise firmware embedded in the hardware platform. In these native embodiments, the first guest operating system 104 and the second guest operating system 106 may execute at a second level above the hardware. In still further embodiments, the hypervisor 102 may comprise software for execution within an operating system environment 108 of the information handling system device 100. In these hosted embodiments, the first guest operating system 104 and the second guest operating system 106 may execute at a third level above the hardware.

The information handling system device 100 is operatively coupled with a device 110 implementing I/O virtualization for data transmission. For example, in one specific embodiment, the information handling system device 100 may be connected to a Peripheral Component Interconnect (PCI) Express device providing Single Root I/O Virtualization (IOV) according to the PCI Special Interest Group (PCI-SIG) IOV Specifications. While the PCI Express interface format is described with some specificity, it will be appreciated that the device 110 may implement other various interface formats as desired, including various modifications of the PCI-SIG IOV Specifications.

The hypervisor 102 includes a paravirtualization driver 112 for facilitating data transfer between the guest operating systems 104, 106 and the device 110. The hypervisor 102 provides for data transfer between the guest operating systems 104, 106 and the device 110 by formulating work query entries for the device 110 according to the I/O virtualization of the device 110. Continuing the previous example of a device implementing the PCI Express interface format with Single Root IOV, the operating system environment 108 and/ or the hypervisor 102, in combination with the paravirtualization driver 112, may enumerate a Single Root IOV device per the PCI Express specification. Then, guest operating systems/virtual machines may communicate with the device, transmitting data via the paravirtualization driver 112. In this manner, paravirtualization may enable the information handling system device 100 to exploit Central Processing Unit (CPU) virtualization acceleration features without requiring device-specific logic in either hardware or the hypervisor 102.

The paravirtualization driver 112 formulates work query entries according to the I/O virtualization of the device 110, but it does not assign virtual functions to the guest operating systems 104, 106. For example, in one specific embodiment, illustrated in FIG. 2, the paravirtualization driver 112 formulates work query entries according to the I/O virtualization of the device 110 by physical function funneling. In this embodiment, the paravirtualization driver 112, communicating through a physical function, creates various work queue entries that incorporate the Routing Identification (ID) of corresponding virtual functions, 210. Establishing the Routing ID's for the virtual functions may be done in a device-specific manner. Then, a work queue entry may be routed to a work queue within a device's physical function, 220. Further, the device may extract the Routing ID from the work queue entry and perform corresponding data transfer(s) utilizing the extracted Routing ID, 230. It will be appreciated that the virtual functions need not be accessed further, and/or that the virtual functions' memory spaces may not need to be enabled. Also, it should be noted that in this physical function funneling embodiment, silicon cost may be saved by implementing a single queue inside the device 110 and multiple queues in the paravirtualization driver 112. However, the device 110 may also be implemented with more than one queue.

In another specific embodiment, illustrated in FIG. 3, the paravirtualization driver 112 formulates work query entries according to the I/O virtualization of the device 110 by paravirtualization driver de-multiplexing. In this embodiment, the hypervisor 102 may assign one or more virtual functions (including their memory spaces) to the paravirtualization driver 112, 310. For example, the hypervisor 102 may assign a first virtual function 114 and a second virtual function 116 to the paravirtualization driver 112. Then, the paravirtualization driver 112 may route each work queue entry to an appropriate virtual function, 320, communicating through standard Single Root IOV mechanisms. Further, a device may determine the Routing ID from a virtual function and perform corresponding data transfer(s) utilizing the determined Routing ID, 330.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
    a device implementing a Peripheral Component Interconnect (PCI) Express interface with Single Root Input/Output (I/O) Virtualization;
    an information handling system comprising a processing device operatively coupled with the device, the processing device configured for executing an operating system control program to manage one or more guest operating systems on the information handling system device, the operating system control program including a paravirtualization driver for formulating a work queue entry according to the Single Root I/O Virtualization of the device,
    wherein data is transmitted between the one or more guest operating systems and the device via the paravirtualization driver, the paravirtualization driver communicates through physical function funneling including formulation of a work queue entry utilizing a Routing Identification (ID) for a corresponding virtual function of the device.

2. The system of claim 1, wherein the device is implemented with a single work queue.

3. The system of claim 1, wherein the device is implemented with a plurality of work queues.

4. The system of claim 1, wherein the operating system control program assigns one or more virtual functions to the paravirtualization driver.

* * * * *